DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 31, 1971

889 O.G. 1364

T889,010
ELECTRICAL CAPACITORS

John Graham Tapley, Welwyn Garden City, England, assignor to Imperial Chemical Industries Limited, London, England

Filed Aug. 18, 1970, Ser. No. 64,807
Claims priority, application Great Britain, Aug. 25, 1969, 42,260/69
Int. Cl. H01g *3/04*
U.S. Cl. 317—259
1 Sheet Drawing. 7 Pages Specification

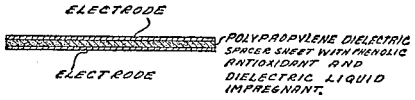

Electrical capacitors containing polypropylene spacer sheets which contain 0.01 to 1.0% by weight of a phenolic antioxidant; the capacitor is also impregnated with a dielectric liquid comprising a saturated solution of the phenolic antioxidant. These capacitors have increased life at elevated temperatures as compared with those in which the dielectric liquid is free of the phenolic antioxidant.

Aug. 31, 1971 J. G. TAPLEY T889,010
ELECTRICAL CAPACITORS
Filed Aug. 18, 1970
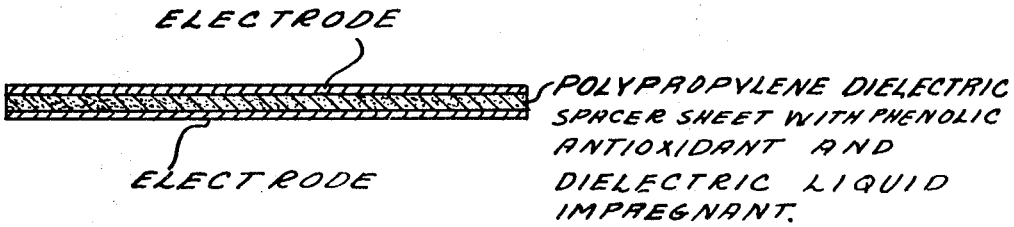
INVENTOR
JOHN GRAHAM TAPLEY
BY Cushman, Darby & Cushman
ATTORNEYS